(12) United States Patent
Chang

(10) Patent No.: US 6,973,390 B2
(45) Date of Patent: Dec. 6, 2005

(54) METHOD AND SYSTEM FOR ANALYZING WAFER YIELD AGAINST USES OF A SEMICONDUCTOR TOOL

(75) Inventor: Huan-Yung Chang, Taichung (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 62 days.

(21) Appl. No.: 10/778,261

(22) Filed: Feb. 13, 2004

(65) Prior Publication Data

US 2005/0182596 A1  Aug. 18, 2005

(51) Int. Cl.⁷ .............................................. G06F 19/00
(52) U.S. Cl. ...................................................... 702/30
(58) Field of Search ..................... 700/108, 110, 121; 716/4; 702/30, 81, 84, 182–185; 438/5–18

(56) References Cited

U.S. PATENT DOCUMENTS

2002/0170022 A1 * 11/2002 Shirai et al. .................. 716/4

* cited by examiner

Primary Examiner—Michael Nghiem
Assistant Examiner—Cindy D. Khuu
(74) Attorney, Agent, or Firm—Thomas, Kayden, Horstemeyer & Risley

(57) ABSTRACT

A method for analyzing wafer yield against uses of a semiconductor tool. A yield database includes at least yield data consisting of a wafer identity number, wafer yield, and a serial number of the semiconductor tool. A processing device generates a box plot chart according to the yield data. Thereafter, the processing device generates a P-value statistical chart according to the yield data. Then, the processing device generates a ratio limit chart according to the yield data. The processing device divides a high yield percentage value into a low yield percentage value to generate a deviant quotient. Thereafter, the processing device analyzes influence of the semiconductor equipment on the wafer yield according to the deviation limit and the deviant quotient. Finally, the semiconductor equipment is adjusted according to the box plot chart, the P-value statistical chart, and the ratio limit chart.

25 Claims, 8 Drawing Sheets

| LotID | WATLotID | Type | CPQty | CPDate | BDFile | EqpID |
|---|---|---|---|---|---|---|
| D96157.00 | D96157.00 | N00 | 11 | 20030318 07:58:30 | TMG413_CATA_1_1 | SCATA012 |
| DD6943.00 | DD6943.00 | N00 | 24 | | TMG413_CATA_1_1 | SCATA003 |
| DD6944.00 | DD6944.00 | N00 | 23 | | TMG413_CATA_1_1 | CATA12_T |

| Test-ite | Mean |
|---|---|
| TSMC07 | 13.83 |
| TSMC07 | 48.5 |
| TSMC07 | 62.65 |

649400 ME20X5_DP Date
20030204 15
20030116 09
20030116 17

649400 ME20X5_DP eqp_id
DUFD05#0
DUFD05#0
DUFD05#0

669400 ME30X5_DP Date
20030209 01
20030124 02
20030125 13

669400 ME30X5_DP eqp_id
DUFD05#0
DUFD05#0
DUFD05#0

689400 ME40X5_DP Date
20030216 15
20030128 03
20030129 16

689400 ME40X5_DP eqp_id
DUFD05#0
DUFD05#0
DUFD05#0

689400 ME40X5_DP Date
DUFD05#0
DUFD05#0
DUFD05#0

709400 ME50X5_DP Date
20030220 19
20030131 13
20030102 03

709400 ME50X5_DP eqp_id
DUFD05#0
DUFD05#0
DUFD05#0

829400 TME0X5_DP Date
20030225 00
20030103 09
20030104 10

829400 TME0X5_DP eqp_id
DUFD05#0
DUFD05#0
DUFD02#0

FIG. 3

| NO | Serial number | P-value | Count | Group | GoThruTimes /yield mean value /yield standard deviation value/number |
|---|---|---|---|---|---|
| 1 | DUFD02 # 0 | 4.841E-5 | 48 | 5 | 00(33.1/21.90/10),01(50.4/7.48/13), 02(60.4/8.23/16),03(64.1/6.43/7), 04(44.0/35.51/2) |
| 2 | DUFD05 # 0 | 4.841E-5 | 48 | 5 | 01(44.0/35.51/2),02(64.1/6.43/7), 03(60.4/8.23/16),04(50.4/7.48/13), 05(33.1/21.90/10) |

FIG. 5

| semiconductor equipment | high yield group | high yield percentage value | low yield group | low yield percentage value | deviant quotient |
|---|---|---|---|---|---|
| DUFD02 # 0 | 62 | 37.5% | 12 | 16.0% | 0.42 |
| DUFD05 # 0 | 103 | 62.4% | 63 | 84.0% | 1.34 | high yield group (>=50)
low yield group (<50)

FIG. 6

METHOD AND SYSTEM FOR ANALYZING WAFER YIELD AGAINST USES OF A SEMICONDUCTOR TOOL

BACKGROUND OF THE INVENTION

1. Field of the Invention

The present invention relates to a method and system for correlation analysis, and in particular to performing correlation analysis mechanism to target lot yield.

2. Description of the Related Art

Lot yield is important in semiconductor manufacturing, representing not only manufacturing technology but also costs. Yield affects profits, such that increasing yield rate poses a major concern in semiconductor manufacturing.

Complex industrial processes, such as those used in the manufacture of semiconductor integrated circuit devices, typically require tens to hundreds of tightly controlled individual steps and parameters to complete. Yield susceptibility is affected by electrical performance and performance of semiconductor equipment.

Defect testing checks and measures yield during the manufacturing process. Testing occurs after a product completes an individual step, with electrical testing measuring yield, after which the semiconductor product proceeds to the next step.

Inline defect testing scans for particles or defects. Traditionally, defect testing analyzes yield from a single semiconductor tool or process, or like tools or processes, and cannot quickly identify problem sources in semiconductor equipment over multiple steps or unlike processes.

SUMMARY OF THE INVENTION

Accordingly, the invention provides a method and system for analyzing wafer yield against uses of a semiconductor tool, utilizing a box plot chart, a P-value statistical chart, and a ratio limit chart.

The method for analyzing wafer yield against uses of a semiconductor tool utilizes a computer system. First, a yield database provides yield data comprising at least a wafer identity number, wafer yield, and a serial number of the semiconductor tool. Then, a processing device generates a box plot chart comprising at least a tendency line, and correlation between the semiconductor equipment and the wafer yield is analyzed according to the tendency line. Thereafter, the processing device generates a P-value statistical chart comprising at least one P-value, and correlation between the semiconductor equipment and the wafer yield is analyzed according thereto. The processing device generates a ratio limit chart comprising a high yield group and a low yield group, and divides a high yield percentage value into a low yield percentage value to generate a deviant quotient. Thereafter, the processing device analyzes correlation between the semiconductor equipment and the wafer yield according to comparison of the deviant quotient with a deviation limit. Finally, the semiconductor equipment is adjusted according to analysis of the box plot chart, the P-value statistical chart, and the ratio limit chart.

The present invention provides another method for analyzing wafer yield against uses of a semiconductor tool. First, a yield database provides yield data comprising at least a wafer identity number, wafer yield, and a serial number of the semiconductor tool. Then, a processing device generates a box plot chart comprising at least a tendency line, and correlation between the semiconductor equipment and the wafer yield is analyzed according to the tendency line. Thereafter, the processing device generates a P-value statistical chart comprising at least one P-value, and correlation between the semiconductor equipment and the wafer yield is analyzed according thereto. Then, the processing device generates a ratio limit chart comprising a high yield group and a low yield group and divides a high yield percentage value into a low percentage value to generate a deviant quotient. Then, correlation between the semiconductor equipment and the wafer yield is analyzed according to comparison of the deviant quotient with a deviation limit. Thereafter, the semiconductor equipment is adjusted accordingly. Finally, the semiconductor equipment manufactures a semiconductor product.

The system for analyzing wafer yield against uses of a semiconductor tool according to the present invention comprises a yield database and a processing device.

The yield database comprises yield data, further comprising at least a wafer identity number, wafer yield, and a serial number of the semiconductor tool.

The processing device is connected to the yield database to generate a box plot chart, a P-value statistical chart, and a ratio limit chart. The box plot chart comprising at least a tendency, the P-value statistic chart comprises at least one P-value, and the ratio limit chart comprises at least a high yield group and a low yield group.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3 is a schematic view of yield data according to the present invention;

FIG. 5 is a schematic view of the P-value statistical chart according to the present invention;

FIG. 6 is a schematic view of the ratio limit chart according to the present invention;

DETAILED DESCRIPTION OF THE INVENTION

Figure 1A:
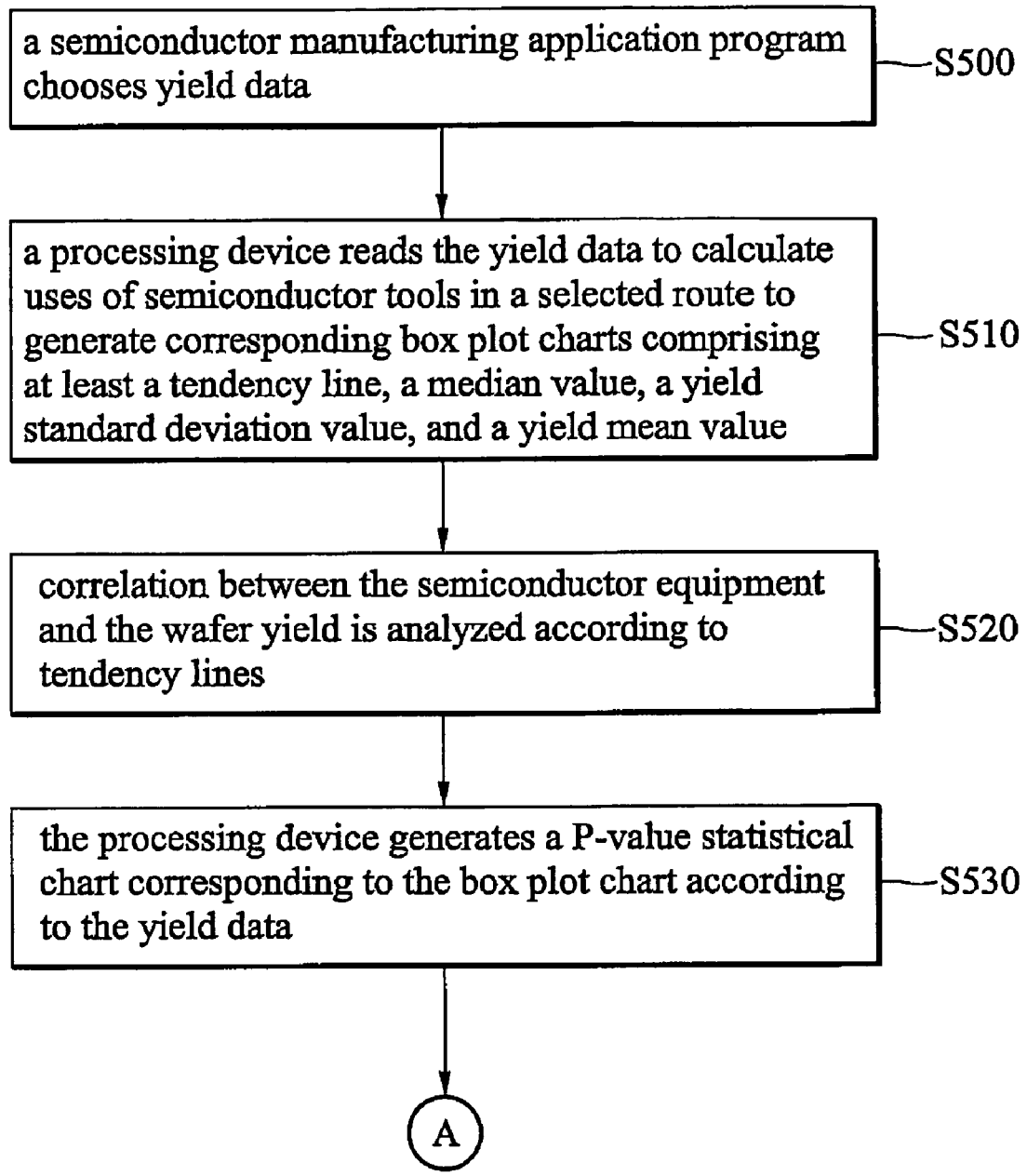
FIGS. 1a and 1b are flowcharts illustrating the method for analyzing wafer yield against uses of a semiconductor tool according to the present invention.
Figure 1B:
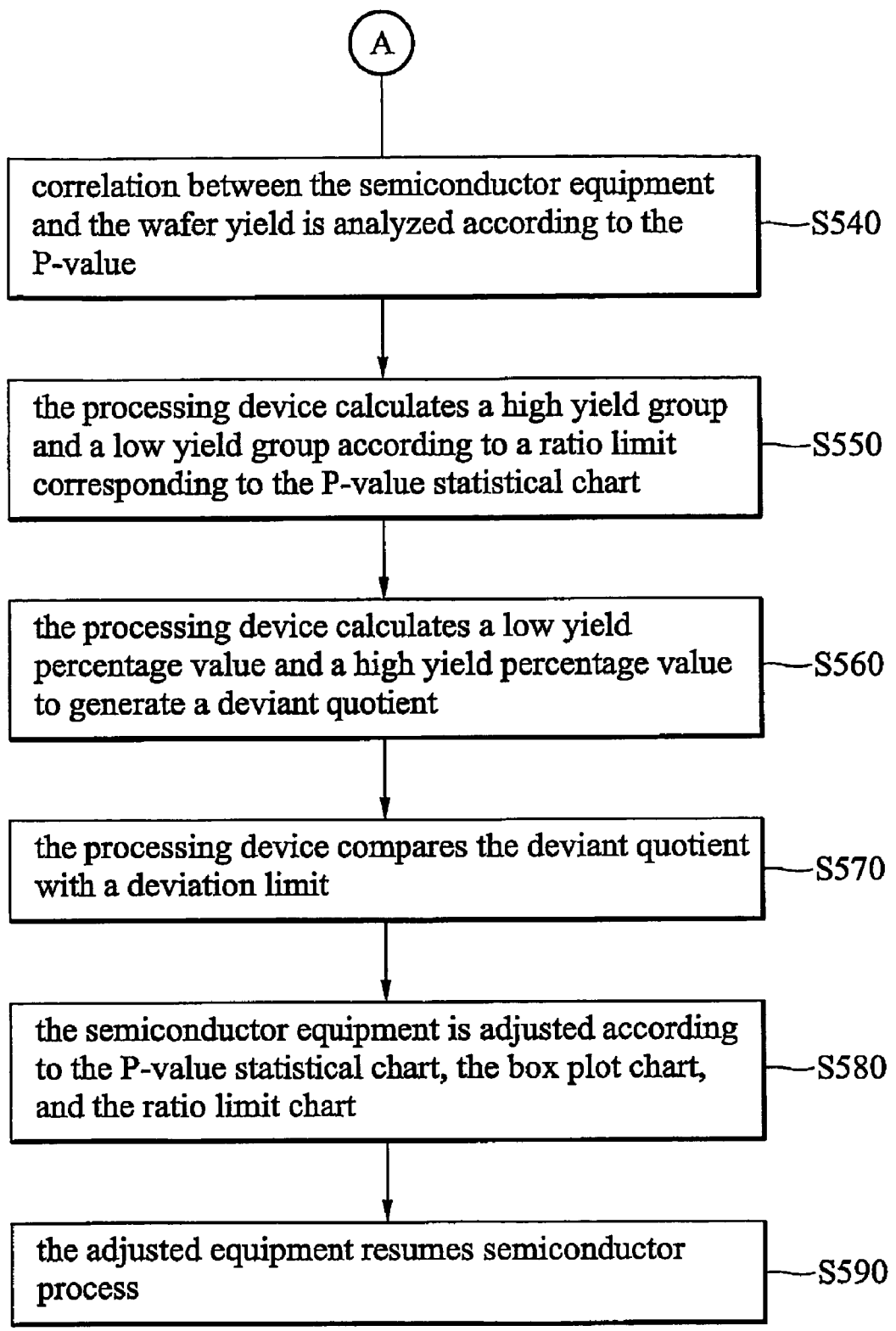
Figure 2:
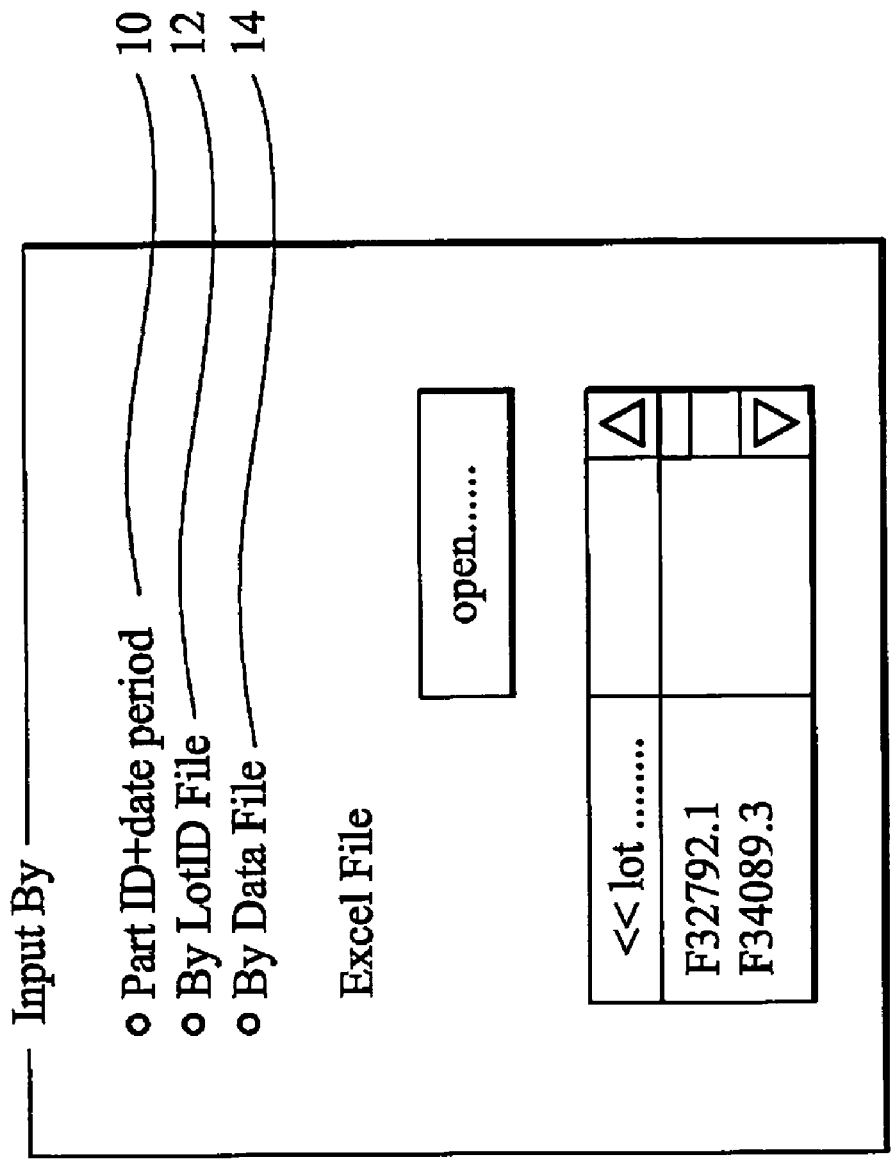
FIG. 2 is a schematic view showing the semiconductor manufacturing application program according to the present invention.

FIGS. 1a and 1b are flowcharts illustrating the method for analyzing wafer yield against uses of a semiconductor tool according to the present invention and FIG. 2 is a schematic view of the semiconductor manufacturing application program according to the present invention.

First, in step S500, a semiconductor manufacturing application program chooses yield data, such as lot ID file 12, part ID and date period 10 or data file 14.

FIG. 3 is a schematic view of the yield data according to the present invention. The yield data comprises at least lot identity number 20, a testing date 22, a testing quantity 24, equipment ID 26, a bin definition file 28, and a yield mean value 30.

In step S510, a processing device reads the yield data to calculate uses of semiconductor tools in a selected route to generate corresponding box plot charts comprising at least a tendency line, a median value, a yield standard deviation value, and a yield mean value.

Figure 4:
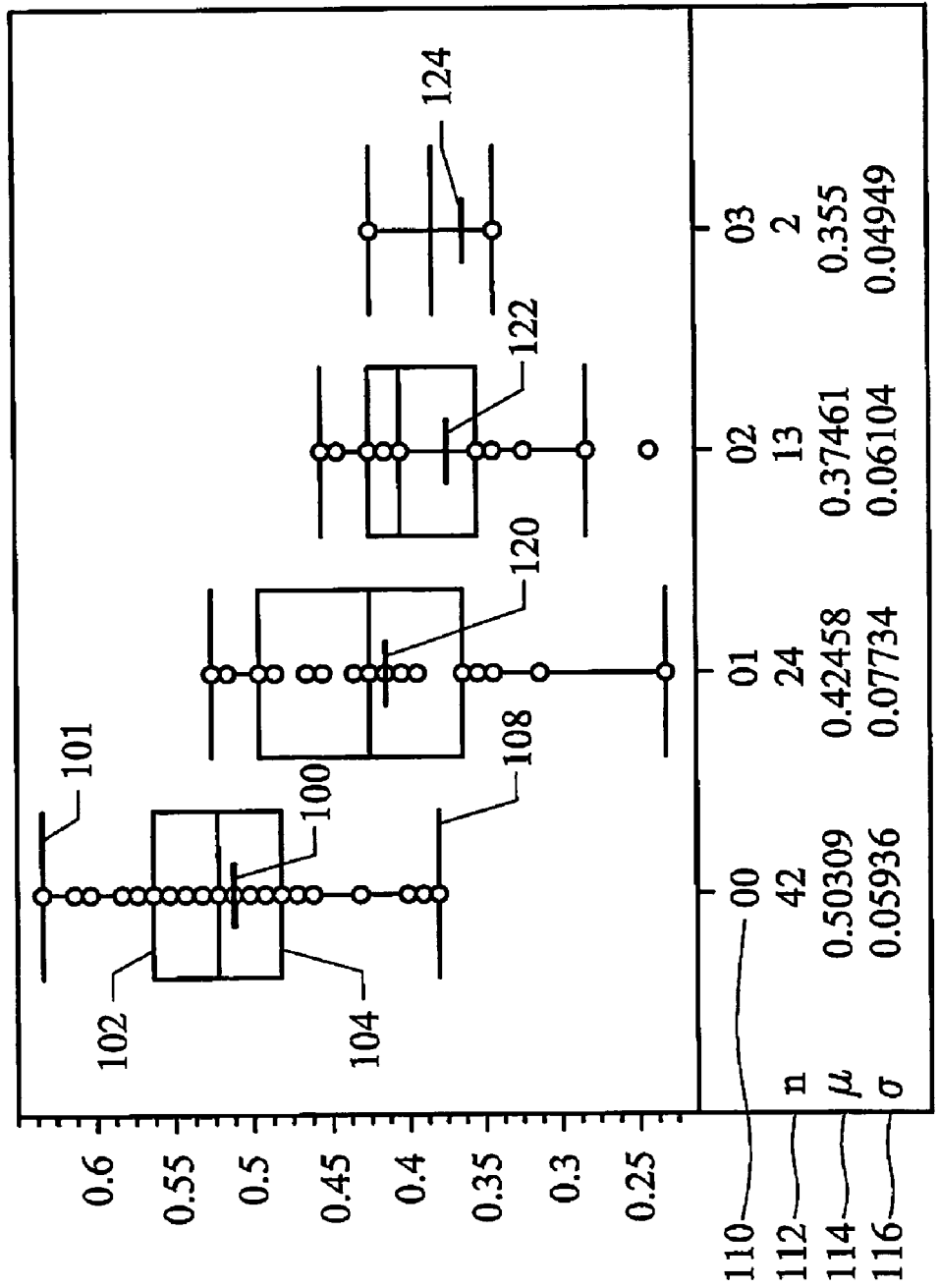
FIG. 4 is a schematic view of the box plot chart according to the present invention.

FIG. 4 is a schematic view of the box plot chart according to the present invention. The box plot chart comprises four data groups. The vertical line in the box plot chart is a yield range from 0 to 0.65. N 112 is the number of wafer passes through the semiconductor equipment. $\mu$ 114 is the yield mean value. $\sigma$ 116 is the yield standard deviation value.

In step S520, correlation between the semiconductor equipment and the wafer yield is analyzed according to tendency lines. FIG. 4 shows 81 wafers tested. First data group shows 42 wafers not passing through the semiconductor equipment. First data group comprises yield range from 0.37 to 0.61, the upper limit 101 is 0.61, the lower limit 108 is 0.37, the median value 100 is 0.51, the ¾ deviation 102 is 0.55, the ¼ deviation 104 is 0.47, the yield mean value 114 is 0.50309 and the yield standard deviation value 116 is 0.05936. The mean value drops from 0.51 to 0.36 according to tendency lines 118, 120, 122, 124, such that wafers frequency passing through the semiconductor equipment cause lower yield rate.

In step S530, the processing device generates a P-value statistical chart corresponding to the box plot chart according to the yield data. The P-value statistical chart comprises at least one P-value, representing a standard to judge the correlation significance between the uses of semiconductor equipment and yield data under certain significance level. For example, under the significance level $\alpha=0.05$, if P-value is less than 0.05, it implies that the uses of semiconductor equipment are with significant correlation with the yield data. Correlation between the semiconductor equipment and the wafer yield is analyzed according to a P-value statistical chart corresponding to the box plot chart.

FIG. 5 is a schematic view of the P-value statistical chart according to the present invention. The serial number 300 of the semiconductor equipment is DUFD02#0. The P-value 302 is 0.4841E-5. Forty-eight wafers are separated into five groups 306. Peak performing semiconductor equipment is easily identified by increasing tendency lines.

In step S540, correlation between the semiconductor equipment and the wafer yield is analyzed according to the P-value 302. When the value 302 is lower than 0.05, which is the significant correlation between the uses of semiconductor equipment and the yield, the semiconductor equipment must be examined carefully.

FIG. 6 is a schematic view of the ratio limit chart according to the present invention. In step S550, the processing device calculates a high yield group and a low yield group according to a ratio limit corresponding to the P-value statistical chart. The processing device sorts 240 wafers by the ratio limit 640 of 50%. The high yield group 610 comprises sixty-two wafers passing through the semiconductor equipment 600 DUFD02#0, wherein each wafer yield exceeds 50%. The low yield group 620 comprises 12 wafers passing through the semiconductor equipment 600 DUFD02#0, wherein each wafer yield is less than 50%. The high yield group 610 comprises 103 wafers passing through the semiconductor equipment 600 DUFD05#0, wherein each wafer yield exceeds 50%. The low yield group 620 comprises 63 wafers passing through the semiconductor equipment 600 DUFD03#0, wherein each wafer yield is less than 50%.

In step S560, the processing device calculates a low yield percentage value and a high yield percentage value to generate a deviant quotient. 16% of wafers passing through the semiconductor equipment 600 DUFD02#0 fall into the low yield group 620 and 37.5% into the high yield group 610. The low yield percentage value 625 of 16% divided by the high yield percentage value 615 37.5% generates a deviant quotient 630 of 0.42.

In step S570, the processing device compares the deviant quotient 630 with a deviation limit. If the deviant quotient 630 exceeds 1.5, the semiconductor equipment is checked.

In step S580, the semiconductor equipment is adjusted according to the P-value statistical chart, the box plot chart, and the ratio limit chart. Finally, in step S590, the adjusted equipment resumes semiconductor process.

Figure 7:
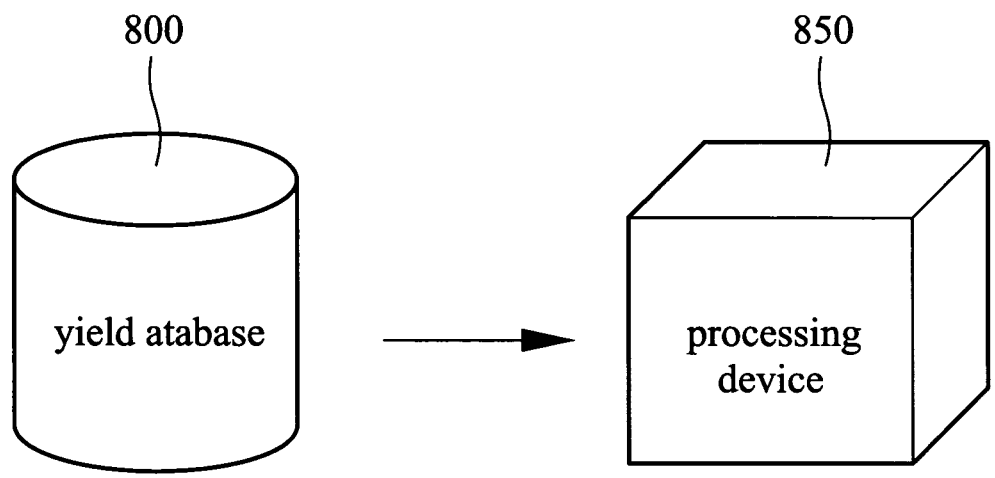
FIG. 7 is a schematic view of a system for analyzing wafer yield against uses of a semiconductor tool according to the present invention.

FIG. 7 is a schematic view of the system for analyzing wafer yield against uses of a semiconductor tool according to the present invention, comprising a yield database 800 and a processing device 850.

The yield database 800 comprises yield data, further comprising at least a wafer identity number, wafer yield, and a serial number of a semiconductor tool or group.

The processing device 850 generates a box plot chart according to the yield data. The box plot chart comprises at least a median value, a yield standard deviation value and a yield mean value.

The processing device 850 generates a P-value statistical chart according to the yield data, representing a standard to judge the correlation significance between the semiconductor equipment and yield data under certain significance level.

The processing device 850 generates a ratio limit chart according to the yield data, comprising a high yield group and a low yield group according to a ratio limit, and then divides a low yield percentage value by a high yield percentage value to generate a deviant quotient.

Figure 8:
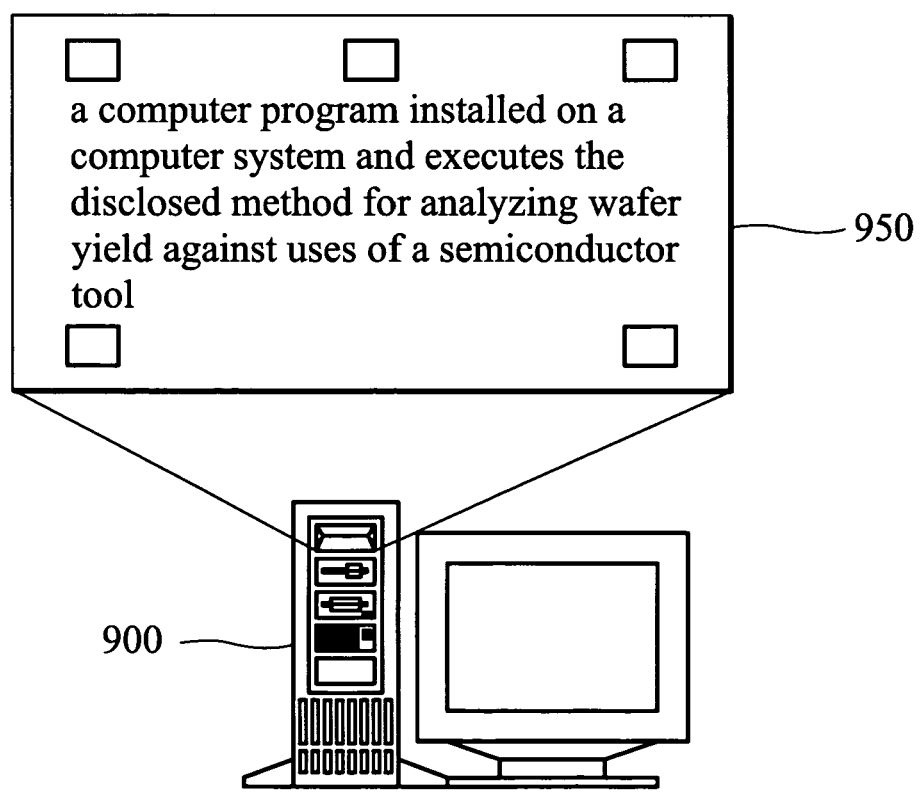
FIG. 8 is a schematic view of the storage medium according to the present invention.

FIG. 8 is a schematic view of the storage medium according to the present invention.

A storage medium 900 comprises a computer program installed on a computer system and executes the disclosed method for analyzing wafer yield against uses of a semiconductor tool 950.

The present invention provides a method and system for analyzing wafer yield against uses of a semiconductor tool, for effective identification of yield impact related to equipment performance, utilizing a P-value statistical chart, box plot chart, and ratio limit chart for correlation analysis, thereby substantially increasing yield and avoiding defect impact.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for analyzing wafer yield against uses of a semiconductor tool, comprising the steps of:
    providing at least yield data comprising at least a wafer identity number, wafer yield, and a serial number of the semiconductor tool;

generating a box plot chart comprising at least a tendency line and analyzing correlation between the semiconductor equipment and the wafer yield according to the tendency line;

generating a P-value statistical chart comprising at least one P-value and analyzing correlation between the semiconductor equipment and the wafer yield according to the P-value;

generating a ratio limit chart comprising a high yield group and a low yield group;

dividing the high yield group into the low yield group to generate a deviant quotient;

providing a deviation limit, and analyzing correlation between the semiconductor equipment and the wafer yield according to comparison of the deviant quotient with a deviation limit; and adjusting the semiconductor equipment according to the box plot chart, the P-value statistical chart, and the ratio limit chart.

2. The method as claimed in claim 1, wherein the box plot chart shows the number of wafer passes through the semiconductor equipment, and comprises at least a median value, a yield standard deviation value and a yield mean value.

3. The method as claimed in claim 1, wherein the P-value represents a standard to judge the correlation significance between the uses of semiconductor equipment and yield data under certain significance level.

4. The method as claimed in claim 1, further comprising generating the high yield group and the low yield group according to a ratio limit.

5. The method as claimed in claim 1, wherein the low yield percentage value is divided by the high yield percentage value to generate the deviant quotient.

6. The method as claimed in claim 1, wherein the deviation limit is 1.5.

7. The method as claimed in claim 1, wherein the semiconductor equipment is checked when the deviant quotient exceeds the deviation limit.

8. A method for manufacturing semiconductor products utilizing a computer system performing steps of:

providing at least yield data comprising at least a wafer identity number, wafer yield, and a serial number of the semiconductor tool;

generating a box plot chart comprising at least a tendency line, analyzing correlation between the semiconductor equipment and the wafer yield according to the tendency line;

generating a P-value statistical chart comprising at least one P-value and analyzing correlation between the semiconductor equipment and the wafer yield according thereto;

generating a ratio limit chart comprising a high yield group and a low yield group;

dividing the high yield group into the low yield group to generate a deviant quotient;

providing a deviation limit, and analyzing correlation between the semiconductor equipment and the wafer yield according to comparison of the deviant quotient with a deviation limit;

adjusting the semiconductor equipment according to testing results; and manufacturing a semiconductor product utilizing the semiconductor equipment.

9. The method as claimed in claim 8, wherein the box plot chart shows the number of wafer passes through the semiconductor equipment, comprising at least a median value, a yield standard deviation value and a yield mean value.

10. The method as claimed in claim 8, wherein the P-value represents a standard to judge the correlation significance between the uses of semiconductor equipment and yield data under certain significance level.

11. The method as claimed in claim 8, further comprising generating the high yield group and the low yield group according to a ratio limit.

12. The method as claimed in claim 8, wherein the low yield percentage value is divided by the high yield percentage value to generate the deviant quotient.

13. The method as claimed in claim 8, wherein the deviation limit is 1.5.

14. The method as claimed in claim 8, wherein the semiconductor equipment is checked when the deviant quotient exceeds the deviation limit.

15. A system for analyzing wafer yield against uses of a semiconductor tool, comprising:

a yield database comprising yield data, further comprising a wafer identity number, wafer yield, and a serial number of a semiconductor tool or group; and a processing device connected to the yield database to generate a box plot chart, a P-value statistical chart, and a ratio limit chart, the box plot chart comprising at least a tendency, the P-value statistic chart comprising at least one P-value, and the ratio limit comprising at least a high yield group and a low yield group, and dividing the low yield percentage value by the high yield percentage value to generate a deviant quotient.

16. The system as claimed in claim 15, wherein the P-value represents a standard to judge the correlation significance between the uses of semiconductor equipment and yield data under certain significance level.

17. The system as claimed in claim 15, wherein the processing device compares the deviant quotient with a deviation limit, and the semiconductor equipment is checked when the deviant quotient exceeds the deviation limit.

18. The system as claimed in claim 15, wherein the deviation limit is 1.5.

19. A storage medium storing a computer program for analyzing wafer yield against uses of a semiconductor tool, comprising:

providing at least yield data comprising at least a wafer identity number, wafer yield, and a serial number of the semiconductor tool;

generating a box plot chart comprising at least a tendency line and analyzing correlation between the semiconductor equipment and the wafer yield according to the tendency line;

generating a P-value statistical chart comprising at least one P-value, analyzing correlation between the semiconductor equipment and the wafer yield according thereto;

generating a ratio limit chart comprising a high yield group and a low yield group;

dividing the high yield group into the low yield group to generate a deviant quotient;

providing a deviation limit, and analyzing correlation between the semiconductor equipment and the wafer yield according to comparison of the deviant quotient with a deviation limit; and adjusting the semiconductor equipment according to the box plot chart, the P-value statistical chart, and the ratio limit chart.

20. The storage medium as claimed in claim 19, wherein the box plot chart shows the number of wafer passes through the semiconductor equipment, and comprises at least a median value, a yield standard deviation value, and a yield mean value.

21. The storage medium as claimed in claim 19, wherein the P-value represents a standard to judge the correlation significance between the uses of semiconductor equipment and yield data under certain significance level.

22. The storage medium as claimed in claim 19, wherein a ratio limit is used to generate the high yield group and the low yield group.

23. The storage medium as claimed in claim 19, wherein the low yield group is divided by the high yield group to generate the deviant quotient.

24. The storage medium as claimed in claim 19, wherein the deviation limit is 1.5.

25. The storage medium as claimed in claim 19, wherein the semiconductor equipment is checked when the deviant quotient exceeds the deviation limit.

* * * * *